(12) United States Patent
Bray, Jr.

(10) Patent No.: US 10,893,658 B2
(45) Date of Patent: Jan. 19, 2021

(54) AUTOMATIC WATER DELIVERY APPARATUS

(71) Applicant: Fred Bray, LLC, Fulshear, TX (US)

(72) Inventor: Fred Eugene Bray, Jr., Missouri City, TX (US)

(73) Assignee: Fred Bray, LLC, Fulshear, TX (US)

( * ) Notice: Subject to any disclaimer, the term of this patent is extended or adjusted under 35 U.S.C. 154(b) by 231 days.

(21) Appl. No.: 15/988,997

(22) Filed: May 24, 2018

(65) Prior Publication Data

US 2018/0338471 A1    Nov. 29, 2018

Related U.S. Application Data

(60) Provisional application No. 62/510,346, filed on May 24, 2017, provisional application No. 62/521,289, filed on Jun. 16, 2017.

(51) Int. Cl.
*A01K 7/04*            (2006.01)

(52) U.S. Cl.
CPC ..................... *A01K 7/04* (2013.01)

(58) Field of Classification Search
CPC . A01K 7/04; A01K 7/02; A01K 7/025; A01K 7/022
USPC ......................................................... 119/78
See application file for complete search history.

(56) References Cited

U.S. PATENT DOCUMENTS

| | | | | | |
|---|---|---|---|---|---|
| 1,364,473 | A | * | 1/1921 | Atkinson | A01K 7/04 |
| | | | | | 119/80 |
| 1,477,223 | A | * | 12/1923 | Krey | A01K 7/04 |
| | | | | | 119/79 |
| 1,477,411 | A | * | 12/1923 | Aagaard | A01K 7/04 |
| | | | | | 119/80 |

(Continued)

FOREIGN PATENT DOCUMENTS

GB        1055778 A   *   1/1967  .............. A01K 7/04

*Primary Examiner* — Magdalena Topolski
*Assistant Examiner* — Kevin M Dennis
(74) *Attorney, Agent, or Firm* — Jeffrey Streets; Leela Madan

(57) ABSTRACT

Water delivery apparatuses and associated methods that minimize the amount of time and preparation and/or maintenance work required for a user to supply water to one or more animals are disclosed. In an aspect, water delivery apparatuses and associated methods of use are disclosed that are configured to maintain a substantially consistent water quantity within at least one water reservoir that provides drinkable water to one or more animals. The substantially consistent water quantity may be maintained by configuring at least one float mechanism that comprises at least one sealing element to at least partially block at least one orifice associated with at least one water supply inlet connected to a continuous water supply once the water within the reservoir reaches a certain level, thereby slowing and/or stopping the incoming water flow. When the water later falls below that level, the float mechanism and its associated sealing element may also drop and the orifice of the water supply inlet may become unblocked, thereby allowing more water (Continued)

to enter the reservoir. In this way, a user may not be required to constantly refill or otherwise maintain a water container in order to provide water to one or more animals, thereby saving the user time.

17 Claims, 7 Drawing Sheets

(56) References Cited

U.S. PATENT DOCUMENTS

| | | | | |
|---|---|---|---|---|
| 1,488,086 | A * | 3/1924 | Zieglowsky | A01K 7/04 119/73 |
| 1,520,133 | A * | 12/1924 | McArthur | A01K 7/04 119/77 |
| 1,522,004 | A * | 1/1925 | Fink | A01K 7/04 119/73 |
| 1,543,375 | A * | 6/1925 | Filer | A01K 7/04 119/73 |
| 1,552,461 | A * | 9/1925 | Anderson | A01K 7/04 119/73 |
| 1,619,431 | A * | 3/1927 | Mendizabal | A01K 7/04 137/449 |
| 1,793,431 | A * | 2/1931 | Pelmulder | A01K 7/04 119/73 |
| 1,935,159 | A * | 11/1933 | Mokler | A01K 7/04 137/453 |
| 2,356,982 | A * | 8/1944 | East | A01K 7/04 119/78 |
| 3,076,434 | A * | 2/1963 | Niemoller | A01K 7/022 119/75 |
| 3,270,770 | A * | 9/1966 | Wilson | A01K 7/04 137/434 |
| 3,584,642 | A * | 6/1971 | Wilson | A01K 7/04 137/270 |
| 3,766,939 | A * | 10/1973 | Reitman | F16K 31/22 137/434 |
| 4,114,203 | A * | 9/1978 | Carolan | E03D 11/11 137/577 |
| 4,130,090 | A * | 12/1978 | Bohlmann | A01K 7/04 119/73 |
| 4,221,188 | A * | 9/1980 | Hostetler | A01K 7/02 119/72 |
| 4,291,836 | A * | 9/1981 | Chen-Hsiung | A01G 27/001 137/132 |
| 4,628,867 | A * | 12/1986 | Brougham | A01K 7/04 119/78 |
| 4,922,858 | A * | 5/1990 | Ahrens | A01K 7/04 119/73 |
| 4,986,221 | A * | 1/1991 | Shaw | A01K 7/02 119/73 |
| 5,025,754 | A * | 6/1991 | Plyler | A01K 7/02 119/73 |
| 5,074,250 | A * | 12/1991 | Clark, IV | A01K 39/0213 119/72.5 |
| 5,105,771 | A * | 4/1992 | Schafer | A01K 7/027 119/73 |
| 5,566,639 | A * | 10/1996 | McKinstry | A01K 7/04 119/74 |
| 5,582,132 | A * | 12/1996 | Morton | A01K 7/04 119/80 |
| 5,809,934 | A * | 9/1998 | Gavet | A01K 7/02 119/52.1 |
| 6,397,878 | B1 * | 6/2002 | Nolan | E03C 1/106 137/218 |
| 6,463,880 | B1 * | 10/2002 | Callingham | A01K 7/04 119/78 |
| 6,467,428 | B1 * | 10/2002 | Andrisin | A01K 5/0114 119/51.5 |
| 6,497,197 | B1 * | 12/2002 | Huisma | A01K 5/02 119/75 |
| 8,186,304 | B2 * | 5/2012 | Harper | A01K 7/02 119/61.55 |
| D846,815 | S * | 4/2019 | Darkwah | D30/132 |
| 2011/0239950 | A1 * | 10/2011 | Harper | A01K 7/02 119/74 |
| 2018/0160649 | A1 * | 6/2018 | Hicks | A01K 39/012 |
| 2018/0338471 | A1 * | 11/2018 | Bray, Jr. | A01K 7/04 |

* cited by examiner

AUTOMATIC WATER DELIVERY APPARATUS

CROSS REFERENCE TO RELATED APPLICATIONS

This application claims the benefit, and priority benefit, of U.S. Provisional Patent Application Ser. No. 62/510,346 filed May 24, 2017, titled "AUTOMATED ANIMAL WATERING APPARATUS," and U.S. Provisional Patent Application Ser. No. 62/521,289 filed Jun. 16, 2017, titled "AUTOMATED ANIMAL WATERING APPARATUS," the disclosure of which is incorporated herein in its entirety.

FIELD OF THE DISCLOSURE

The present disclosure generally relates to water delivery apparatuses and more particularly to water delivery apparatuses that are configured to maintain a substantially consistent water quantity supplied to one or more animals for drinking in an at least semi-autonomous fashion.

BACKGROUND

The statements in this section merely provide background information related to the present disclosure and may not constitute prior art.

Many types of animals are kept and cared for by humans for a variety of reasons. For example, cats and dogs provide a source of love and companionship; horses provide recreational enjoyment, companionship, and labor assistance; and various types of livestock provide labor and food, as well as serving to fulfill other various uses.

One of the most fundamental needs of all of the land animals that humans care for is water. While a seemingly simple task, making sure animals stay hydrated can at times be sloppy, labor-intensive, and/or time consuming. Currently available water trays, dishes, bottles, and other water holding and/or dispensing mechanisms must be continuously monitored, manually refilled as needed, maintained, and/or cleaned in order to ensure they reliably satisfy the hydration needs of all the animals that depend on them. For individuals who own many animals, such as farmers and breeders, these chores can become very time consuming very quickly.

Gravity based water delivery systems have been created to alleviate some of the monitoring time and refill frequency associated with providing water to animals; however, these systems still must be manually refilled periodically. The manual refilling process for gravity-based water delivery systems can be particularly difficult or messy when the system requires inverting a water storage container in order to install it. Additionally, these systems are often complex and therefore require preparation, repair, and/or maintenance/cleaning procedures that are more cumbersome than necessary.

Another issue with currently available water delivery devices for animals is that animals are liable to spill water while drinking from the devices. At best this creates a moderate mess, while at worst it may waste a considerable amount of money over a long period of time in wasted water and may even destroy items and/or materials that get wet and thereby incur water damage, forcing them to be discarded and/or replaced, which can be quite costly depending on the extent of the damage. Time may also be spent needlessly in order to routinely clean up messes made by sloppy animal drinking practices and animals may experience one or more symptoms of dehydration if they spill water that they otherwise need to drink.

Given the foregoing, what is needed are water delivery apparatuses that are capable of delivering water to one or more animals while requiring minimal time and effort being spent on preparation, filling, refilling, repair, maintenance, and cleaning tasks. Water delivery apparatuses that are less likely to experience spillage during use are also desired.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing water delivery apparatuses which facilitate the ability of a user to deliver at least one amount of water to one or more animals for drinking while minimizing the amount of preparation, filling, refilling, repair, maintenance, and cleaning tasks involved with such water delivery. Specifically, in an aspect, water delivery apparatuses are disclosed that are configured to maintain a substantially consistent amount or quantity of water available within one or more water storage reservoirs from which one or more animals may drink in an at least semi-autonomous fashion. The substantially consistent water level may be facilitated by the inclusion of at least one float mechanism within at least one portion of the water reservoir(s). The float mechanism(s) may include at least one sealing element configured to at least partially block at least one orifice associated with at least one water supply inlet when the water level within the water reservoir(s) rises to a certain level. The orifice(s) of the water supply inlet(s) may become unblocked once the water level falls (e.g., after one or more animals drink some of it and/or a portion of it spills and/or evaporates) and the sealing element(s) associated with the float mechanism(s) moves. In this way, more water may enter the water reservoir(s) without the user needing to perform any refilling tasks.

In some aspects, the float mechanism(s) associated with the water delivery apparatuses of the present disclosure may be at least partially contained/enclosed within at least one float housing unit comprised of one or more surface portions or sides. The float housing unit(s) may be configured to maintain at least one portion of the float mechanism(s) at a substantially consistent and/or desired location while allowing the rest of the float mechanism(s) to rise and fall with the water lever within the water reservoir(s) in order to ensure the proper functionality of the float mechanism(s) as well as to help establish the level within the water reservoir(s) at which the available quantity of water will be maintained. The float housing unit(s) may, in turn, be at least partially contained under and/or within at least one float protection cover. The float protection cover(s) may be configured to help keep the float housing unit(s) in place as well as protect the float mechanism(s) and/or the float housing unit(s) from environmental damage and/or damage resulting from curious animals and/or foreign debris.

In some aspects, the float mechanism(s) associated with the water delivery apparatuses of the present disclosure may comprise at least one protruding arm member extending from at least one portion thereof, wherein at least one surface of the arm member may include the at least one sealing element that may be configured to at least partially block the at least one orifice of the at least one water supply inlet in order to alter and/or stop the flow of water into the water reservoir(s).

In some aspects, water delivery apparatuses in accordance with the present disclosure may comprise at least one water reservoir that may include one or more sidewalls that are substantially straight and vertically oriented, thereby minimizing the amount of water that may unintentionally splash out during filling or refilling and/or when one or more animals are drinking from the reservoir(s). In some additional aspects, the sidewall(s) may comprise a relatively tall height relative to the water level within the water reservoir(s) in order to further assist with preventing the unintentional spilling of water therefrom.

In some aspects, the materials used to construct the various portions of the water delivery apparatuses in accordance with the present disclosure may be selected so as to experience minimal deterioration, material fatigue, material failure, and/or environmental damage, such as stainless steel and/or plastic composites. Such materials may also be selected so as to be relatively easy to clean. In still some additional aspects, the various portions of the water delivery apparatuses of the present disclosure may be connected with various fastening devices/elements that may be manipulated with simple tools and/or by hand, thereby making maintenance, repair, and/or cleaning tasks relatively fast and easy to complete. In some additional aspects, a minimal number of fastening devices may be used in order to further expedite maintenance and/or repair tasks.

In some aspects, water delivery apparatuses in accordance with the present disclosure may be configured to be permanently or temporarily mounted in place using one or more fasteners in order to minimize the likelihood of the water delivery apparatuses, including the water reservoir(s), from being inadvertently knocked over and/or to fix a given water delivery apparatus at a desired height or otherwise desirable location, such as upon the surface of a wall and/or the side of a building.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

Figure 1:
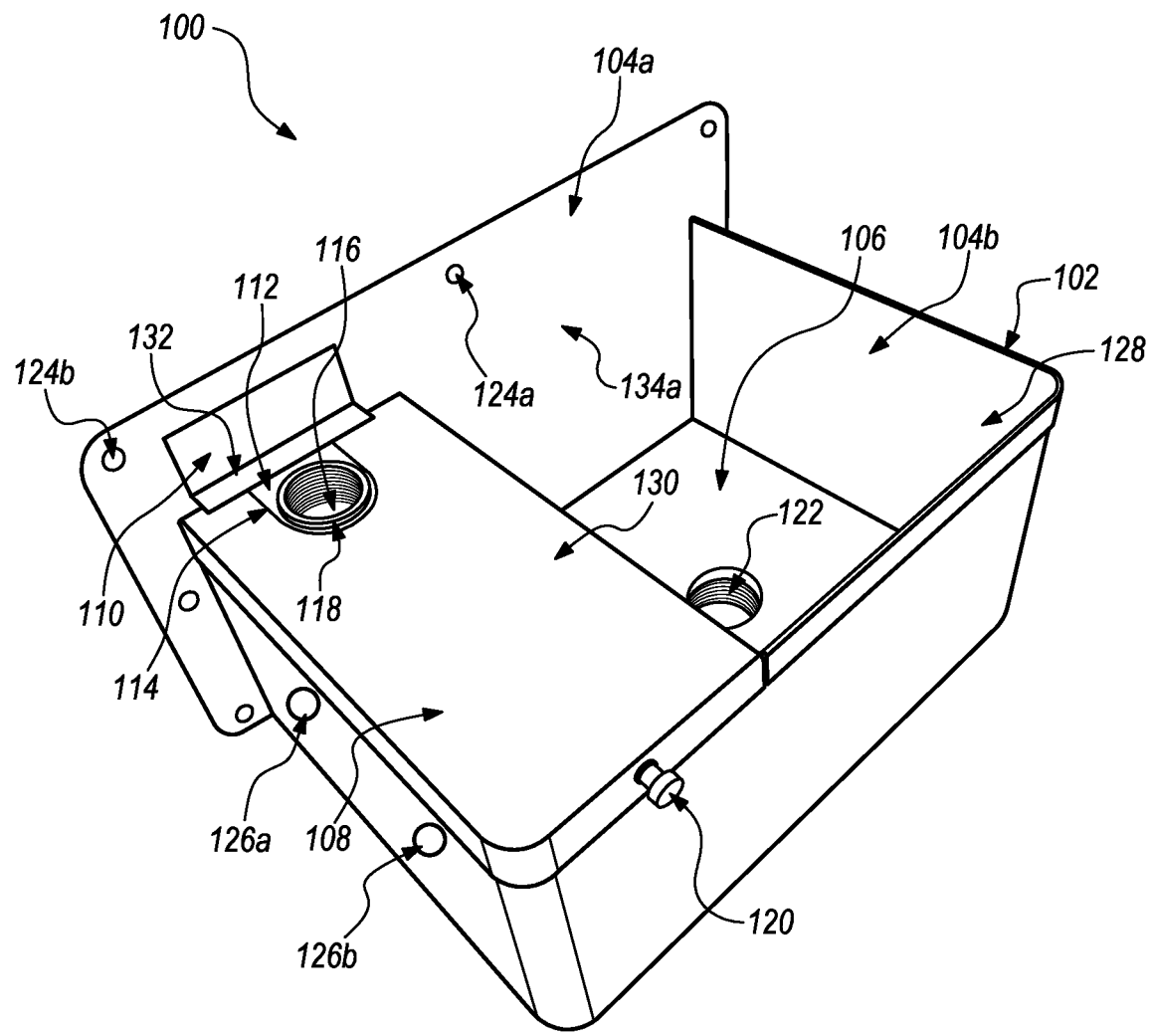
FIG. 1 is a perspective view of an exemplary water delivery apparatus, according to an aspect of the present disclosure.

The present disclosure is directed to water delivery apparatuses that may operate with minimal user engagement. Specifically, in an aspect, water delivery apparatuses are disclosed that, once connected to a continuous water supply, maintain a substantially consistent quantity of water within one or more water reservoirs from which one or more animals may drink in an at least semi-autonomous fashion. The substantially consistent water quantity may be maintained via the functioning of at least one float mechanism that includes at least one sealing element configured to at least partially block at least one orifice within at least one water supply inlet when the water within the water reservoir(s) reaches a certain level associated with the substantially consistent water quantity while allowing for at least partially uninhibited water flow from the orifice(s) of the water supply inlet(s) when the water drops below that level. The substantially consistent water quantity may comprise a water quantity that varies just enough to accommodate the interaction of the sealing element(s) with the orifice(s) as the water level within the water reservoir(s) rises and falls. In some aspects, the float mechanism(s) of the water delivery apparatuses of the present disclosure may be at least partially contained within at least one float housing unit. In some additional aspects, the float mechanism(s) and/or float housing unit(s) may be further contained within one or more float protection covers.

In some aspects, the water reservoir(s) associated with the water delivery apparatuses of the present disclosure may be configured with one or more substantially straight vertically oriented sidewalls in order to minimize spilling and splashing while the water reservoir(s) are being filled and/or while one or more animals are drinking from the water reservoir(s). In some additional aspects, the sidewall(s) may comprise a relatively tall height relative to the water level within the water reservoir(s) to further prevent or minimize the unintentional spilling or release of water from the water reservoir(s).

In some aspects, one or more portions of the water delivery apparatuses in accordance with the present disclosure may be configured to be easily taken apart, repaired, and/or otherwise maintained by using a minimal number of tools and/or by utilizing a user's hands to engage one or more fastening devices/elements. In some additional aspects, one or more portions of the water delivery apparatuses in accordance with the present disclosure may be constructed of materials that have a minimal potential for wear, damage, and/or deterioration and/or are relatively easy to clean or otherwise maintain.

In some aspects, water delivery apparatuses in accordance with the present disclosure may be configured to be permanently or temporarily mounted in place using one or more fasteners in order to minimize the likelihood of the water delivery apparatuses, including the water reservoir(s) associated therewith, from being inadvertently tipped over and/or to fix a given water delivery apparatus at a desired height or otherwise desirable location, such as upon the surface of a wall and/or the side of a building.

The term "water delivery apparatus" and/or the plural form of this term are used throughout herein to refer to any apparatus, machine, device, or combination thereof that at least partially comprises one or more containers, reservoirs, dishes, systems, or similar structures or elements that may be filled with water, either manually, semi-automatically, or automatically, and from which one or more animals may drink, such as troughs, tanks, trays, bowls, dishes, reservoirs, and the like, any of which may be connected to one or more water supplies, either permanently or temporarily.

The term "water supply" and/or the plural form of this term are used throughout herein to refer to any source of water that may be configured to distribute such water to one or more water delivery apparatuses as defined above, such as indoor or outdoor faucets or spigots, pumping mechanisms, bottles, jugs, lakes, ponds, rivers, wells (groundwater), and the like. In some aspects, a water supply may comprise a continuous water supply, wherein water continues to flow until the source is depleted or until a user stops the flow of water, such as when a faucet or spigot is turned on and off, respectively, or when water is continuously drawn from a lake, pond, well (groundwater), or river.

The term "user" and/or the plural form of this term are used throughout herein to refer to any individual that may set up, maintain, repair, clean, fill, or otherwise configure or prepare water delivery apparatuses as defined herein for use, as well as monitor such usage, such as farmers, breeders, pet owners, and the like.

The term "animal" and/or the plural form of this term are used throughout herein to refer to any living creature that may need to drink water in order to survive, such as horses, cows, pigs, goats, dogs, cats, other pets and/or livestock, and the like.

Referring now to FIG. 1, a perspective view of an exemplary water delivery apparatus 100, according to an aspect of the present disclosure, is shown.

In an aspect, water delivery apparatus 100 may comprise at least one water reservoir 102 and at least one float mechanism 202 (not shown in FIG. 1). In some aspects, water delivery apparatus 100 may further comprise at least one float housing unit 112 configured to at least partially contain float mechanism(s) 202. In some additional aspects, float mechanism(s) 202 may be the only element of water delivery apparatus 100 that moves.

Water reservoir(s) 102 may be configured to contain at least one amount of water within at least one interior space 128. Water reservoir(s) 102 may comprise at least one sidewall 104 (labeled only as sidewalls 104a-b in FIG. 1, for clarity). Water reservoir(s) 102 may also comprise a bottom portion 106. In some aspects, water reservoir(s) 102 may comprise four sidewalls 104 and one bottom portion 106 so as to form a five-sided substantially hollow parallelepiped. In some additional aspects, each sidewall 104 may comprise a substantially straight flat surface oriented in a substantially vertical position in order to minimize spilling/splashing that may occur when water reservoir(s) 102 is being filled or refilled and/or while one or more animals are drinking from water reservoir(s) 102. In still some additional aspects, each sidewall 104 may comprise a height that is relatively high when compared to the water level maintained within water reservoir(s) 102 in order to further minimize spilling, splashing, and/or the otherwise unintentional release of water from within water reservoir(s) 102.

In some aspects, water reservoir(s) 102 may comprise at least one predrilled hole 124 (labeled only as holes 124a-b in FIG. 1, for clarity) on one or more sidewalls 104. Predrilled hole(s) 124 may be configured to removably or permanently receive one or more fasteners in order to at least partially mount water delivery apparatus 100 in a desired location and/or to secure water delivery apparatus 100 in a fixed position or location in order to prevent water deliver apparatus 100 from tipping, being knocked over, or being moved without a user's intent. Such fasteners may include, by way of example and not limitation, screws, nails, pins, bolts, nuts, washers, hooks, clamps, clasps, clips, brackets, and the like. Water delivery apparatus 100 may be mounted either permanently or temporarily. By way of example and not limitation, water delivery apparatus 100 may be mounted upon a wall, a building exterior, or any other appropriate location as may be apparent to those skilled in the relevant art(s) after reading the description herein. By way of further example and not limitation, hooks and/or brackets may be particularly useful as fasteners in aspects wherein water delivery apparatus 100 may be mounted in a temporary location. As a nonlimiting example, such hooks and/or brackets may comprise hook brackets that may be approximately 0.3175 cm (0.1250 in.) thick and 5.0800 cm (2.0000 in.) wide and are bent over at a top portion thereof. By way of still further example and not limitation, in aspects wherein each sidewall 104 may comprise a parallelogram, seven holes 124 may be configured upon a rear sidewall 104 of water reservoir(s) 102, with three on a top portion thereof, two on a right portion thereof, and two on a left portion thereof. By way of yet further example and not limitation, each hole 124 may comprise a diameter of approximately 0.79375 cm (0.3125 in.). A user may drill or otherwise manufacture additional holes upon any appropriate portion of water delivery apparatus 100 as desired.

In some aspects, bottom portion 106 of water reservoir(s) 102 may comprise at least one female pipe threaded coupling 122. Coupling(s) 122 may be used as a means to drain or otherwise facilitate the removal of at least one portion of the water from water reservoir(s) 102 when it is in an open/unblocked state. In some additional aspects, coupling(s) 122 may be configured within a relatively central location of bottom portion 106. In still some additional aspects, coupling(s) 122 may comprise a minimum size that is at least sufficient to accommodate an approximately 2.5400 cm (1.0000 in.) nominal National Pipe Taper (NPT) threaded female coupling. In yet some additional aspects, coupling(s) 122 may be configured such that a small vortex is created by any water draining therefrom when coupling(s) 122 is in the open/unblocked state. The vortex may create a force that helps pull small debris such as leaves, dirt, small rocks, sand, and the like from within interior space 128 of water reservoir(s) 102. Coupling(s) 122 may be closed, blocked, and/or filled by any appropriate mechanism(s) as may be apparent to those skilled in the relevant art(s) after reading the description herein, including one or more plugs, bolts, stoppers, ball valves, other valves, and the like, as well as any combination thereof, any of which may comprise, by way of example and not limitation, a male threaded form.

Figure 2:
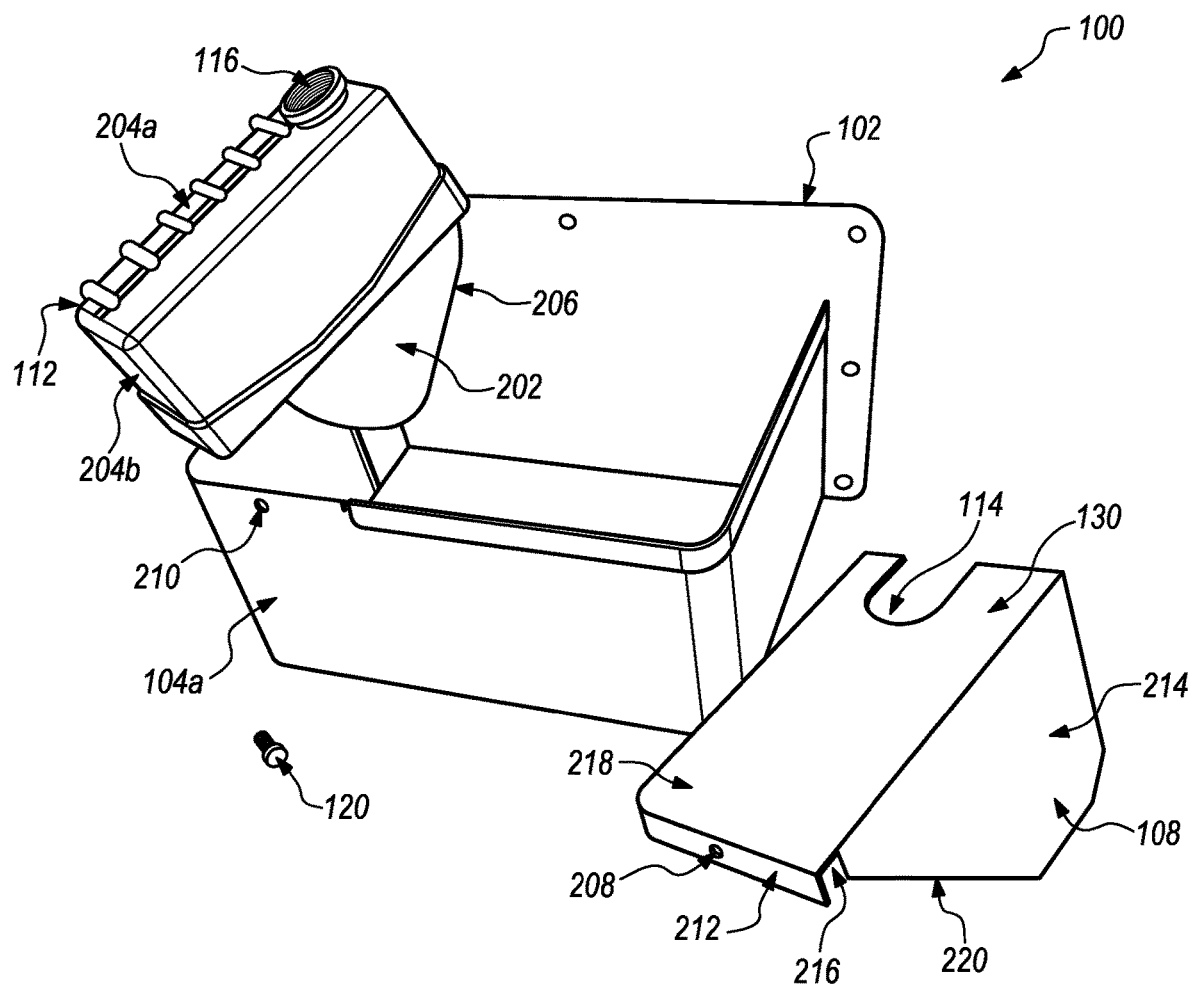
FIG. 2 is a perspective view of a disassembled exemplary water delivery apparatus, according to an aspect of the present disclosure.

In some aspects, water delivery apparatus 100 may further comprise at least one float protection cover 108. By way of example and not limitation, float protection cover(s) 108 may comprise of at least two substantially flat portions 130 and 214 (not shown in FIG. 1) integrated together or connected at two adjoining edges in a substantially perpendicular orientation, as shown in FIG. 2. Such connection may be permanent or temporary and may be made using one or more adhesives, welded joints, screws, nails, pins, bolts, nuts, washers, hooks, clasps, clamps, clips, brackets, or similar connective elements as may be apparent to those skilled in the relevant art(s) after reading the description herein, as well as any combination thereof. In some non-limiting exemplary embodiments, flat portion 214 may comprise at least one angled side portion 220. Among other things, float protection cover(s) 108 may function to at least partially maintain float mechanism(s) 202 in a desired location within water reservoir(s) 102 and/or to protect float mechanism(s) 202 from environmental damage, foreign debris, and/or damage from curious animals.

Float protection cover(s) 108 may be securely or removably attached to an inner portion 134 (labeled only as inner portion 134*a* in FIG. 1, for clarity) of one or more sidewalls 104. By way of example and not limitation, float protection cover(s) 108 may be secured to an upper inner portion 134 of three sidewalls 104. At least one distal end portion of float protection cover(s) 108 may be securely attached using one or more fastening elements 120. By way of example and not limitation, fastening element(s) 120 may comprise screws, nails, pins, bolts, nuts, washers, hooks, clamps, clasps, clips, and/or brackets, as well as any similar elements as may be apparent to those skilled in the relevant art(s) after reading the description herein, including any combination thereof. By way of further example and not limitation, in some aspects, fastening element(s) 120 may comprise a #10-32 threaded knurled brass thumb screw that is at least approximately 0.9525 cm (0.3750 in.) long. In such an aspect, the thumb screw may negate the need for a user to utilize one or more tools in order to remove float protection cover(s) 108; instead, the thumb screw may be manipulated by a user's hand(s), thereby helping to facilitate the quick and/or easy removal of float protection cover(s) 108 in order to allow a user to perform one or more cleaning, repair, and/or maintenance tasks, such as, by way of example and not limitation, the replacement of float mechanism(s) 202. In some additional aspects, fastening element(s) 120 may be engaged using a minimal number of tools, such as a screwdriver, a wrench, and/or pliers, as well as any similar tools as may be apparent to those skilled in the relevant art(s) after reading the description herein, including any combination thereof.

In some aspects, a second distal end portion of float protection cover(s) 108 may be secured in place by using at least one mounting bracket 110. Mounting bracket(s) 110 may secure the second distal end portion of float protection cover(s) 108 to an inner portion 134 of a sidewall 104 that opposes the sidewall 104 to which fastening element(s) 120 may be secured. By way of example and not limitation, mounting bracket(s) 110 may comprise a width of approximately 3.1700 cm (1.2500 in.) and a length of approximately 7.6200 cm (3.0000 in.). By way of further example and not limitation, mounting bracket(s) 110 may be attached to an inner portion 134 of the relevant sidewall 104 via welding or any similar means as may be apparent to those skilled in the relevant art(s) after reading the description herein. In some other nonlimiting exemplary embodiments, mounting bracket(s) 110 may be secured via one or more adhesives, bolts, nails, pins, screws, nuts, washers, hooks, clasps, clamps, clips, brackets, or similar connective elements as may be apparent to those skilled in the relevant art(s) after reading the description herein, including any combination thereof. In some additional aspects, mounting bracket(s) 110 may be bent in a substantially perpendicular fashion so as to form an L-shape. In still some additional aspects, mounting bracket(s) 110 may not be secured to float protection cover(s) 108, but rather may serve to prevent float protection cover(s) 108 from moving by causing a top surface 218 (not labeled in FIG. 1, for clarity) of flat portion 130 of float protection cover(s) 108 to make at least partial physical contact with at least part of a bottom surface 206 (not shown in FIG. 1) of a protruding portion 132 of mounting bracket(s) 110 in order to help keep float protection cover(s) 108 in place. In such aspects, float protection cover(s) 108 may be configured to disengage from protruding portion 132 of mounting bracket(s) 110 when fastening element(s) 120 is removed, thereby releasing the opposing end of float protection cover(s) 108 from its state of limited or no movement.

In some aspects, float protection cover(s) 108 may further comprise at least one open slot 114 at an upper portion thereof (such as, by way of example and not limitation, within flat portion 130). By way of example and not limitation, slot(s) 114 may comprise a width of approximately 3.8100 cm (1.5000 in.) and a length of approximately 3.4925 cm (1.3750 in.). By way of further example and not limitation, one or more interior edge portions of slot(s) 114 may be at least slightly rounded. Slot(s) 114 may allow at least one water supply to access and be removably or permanently connected to at one least water supply inlet 118 associated and/or integrated with float housing unit(s) 112. In some additional aspects, water supply inlet(s) 118 may be configured to allow water to enter float housing unit(s) 112 via at least one orifice 116. Additionally, slot(s) 114 may allow at least partial access to float housing unit(s) 112 to allow a user to make adjustments to, perform repairs on, engage in routine cleaning of, or otherwise maintain float housing unit(s) 112.

In some aspects, by way of example and not limitation, water supply inlet(s) 118 may comprise a female threaded garden hose connection with an outside thread diameter of approximately 2.6700 cm (1.0520 in.). By way of further example and not limitation, water supply inlet(s) 118 may be formed within a top portion of float housing unit(s) 112 near a distal end thereof, such as the distal end configured nearest to mounting bracket(s) 110.

In some aspects, water supply inlet(s) 118 may comprise at least one orifice 116. In such aspects, orifice(s) 116 may be the portion of water supply inlet(s) 118 through which water actually flows. By way of example and not limitation, orifice(s) 116 may comprise a circular shape with a diameter of approximately 0.43434 cm (0.1710 in.). This diameter may allow for rapid filling of float housing unit(s) 112 if needed (and water reservoir(s) 102). By way of example and not limitation, water may enter float housing unit(s) 112 at a rate of approximately 200 gallons per hour (gph). Having a relatively rapid fill rate may help facilitate the ability of one or more animals to drink from water delivery apparatus 100 without having to stop and wait for more water. By way of further example and not limitation, water may be supplied to water supply inlet(s) 118 and/or orifice(s) 116 via a garden hose, hard piping, polyvinyl chloride (PVC) piping, or other similar structures as may be apparent to those skilled in the relevant art(s) after reading the description herein, as well as any combination thereof.

In some aspects, water delivery apparatus 100 may be integrated with one or more flow meters. Such flow meter(s) may be configured to be used to measure and/or record the amount of water that enters water delivery apparatus 100, thereby informing a user of how much water is being consumed by the animal(s) drinking from water delivery apparatus 100. Watching for fluctuations in water consumption may signal to the user when an animal(s) is experiencing an illness or dehydration, thereby allowing the user to take necessary steps to resolve the issue before it gets worse. By way of example and not limitation, one or more flow meters may be attached or otherwise secured to water delivery apparatus 100 using one or more fittings, hoses, screws, nails, pins, bolts, nuts, washers, hooks, clamps, clasps, clips, brackets, and the like, as well as any combination thereof. By way of further example and not limitation, each flow meter may be mounted, affixed, or otherwise attached/configured to, at, or near water supply inlet(s) 118 and/or orifice(s) 116. By way of still further example and not limitation, one or more flow meters may comprise a digital flow meter.

In some aspects, water reservoir(s) 102, float protection cover(s) 108, and/or mounting bracket(s) 110 may be comprised of one or more materials that are substantially resistant to deterioration, material fatigue, material failure, wear, environmental damage, and other sources of damage. By way of example and not limitation, such material(s) may comprise stainless steel, plastic composites, and the like, as well as any combination thereof. By way of further example and not limitation, water reservoir(s) 102, float protection cover(s) 108, and/or mounting bracket(s) 110 may be comprised of one or more various other materials, including other metals, plastics, rubber, wood, vinyl, stone, other polymers, and the like, as well as any combination thereof. Other materials may be used as well for water reservoir(s) 102, float protection cover(s) 108, and/or mounting bracket(s) 110 as may be apparent to those skilled in the relevant art(s) after reading the description herein.

In some aspects, by way of example and not limitation, float housing unit(s) 112 may be comprised of one or more composite materials, aluminum, or similar materials configured to resist deterioration, material fatigue, material failure, wear, environmental damage, and other sources of damage. By way of further example and not limitation, float housing unit(s) 112 may be comprised of one or more various other materials, including other metals, plastics, rubber, wood, vinyl, stone, other polymers, and the like, as well as any combination thereof. Other materials may be used as well for float housing unit(s) 112 as may be apparent to those skilled in the relevant art(s) after reading the description herein.

In some aspects, the sidewall 104 that is adjacent to the surface portion 204 (not labeled in FIG. 1, for clarity) of float housing unit(s) 112 that is not proximal to mounting bracket(s) 110 or fastening element(s) 120 may include at least one female pipe threaded coupling and associated hole 126 protruding therefrom and passing therethrough, respectively (shown as pipe threaded couplings/holes 126*a-b* in FIG. 1). A pair of pipe threaded couplings/holes 126 may be spaced approximately 19.3675 cm (7.6250 in.) apart center-to-center in order to accept the connections for a water heating device in order to allow a user to heat water within float housing unit(s) 112 (and water reservoir(s) 102). By way of example and not limitation, each pipe threaded coupling/hole 126 may comprise a minimum size that is at least sufficient to accommodate an approximately 1.2700 cm (0.5000 in.) nominal National Pipe Taper (NPT) threaded female coupling in order to accommodate an emersion heater that may or may not be integrated with at least one temperature control switch in order to control the temperature of the water within float housing unit(s) 112 (and water reservoir(s) 102). Pipe threaded couplings/holes 126 may be helpful, for example, during cold conditions in order to prevent the water within float housing unit(s) 112 (and water reservoir(s) 102) from freezing and thereby becoming undrinkable.

By way of example and not limitation, in order to facilitate the cleaning of water delivery apparatus 100, a given water supply may be maintained in an at least partially "on" state wherein water is allowed to flow into water supply inlet(s) 118 and/or orifice(s) 116 while coupling(s) 122 is left in an open or unblocked state. This may allow water to flow freely through the various portions of water delivery apparatus 100, including float housing unit(s) 112 and/or water reservoir(s) 102, and carry dirt and/or debris with it as it leaves (drains) via coupling(s) 122. By way of example and not limitation, such debris may comprise leaves, dirt, sand, rocks, and the like. In some aspects, various cleaners may be added to the flowing water to make the cleaning process easier and/or more effective as may be apparent to those skilled in the relevant art(s) after reading the description herein, including but not limited to one or more soaps, detergents, surfactants, disinfectants, and the like.

Although various exemplary shapes, sizes, and configurations for the various portions of water delivery apparatus 100 have been given, as will be appreciated by those skilled in the relevant art(s) after reading the description herein, other shapes, sizes, and configurations may be used without departing from the spirit and scope of the present disclosure. Thus, the present disclosure shall not be limited to those exemplary shapes, sizes, and configurations.

Referring now to FIG. 2, a perspective view of a disassembled exemplary water delivery apparatus 100, according to an aspect of the present disclosure, is shown.

As shown in FIG. 2, in some aspects, by way of example and not limitation, float housing unit(s) 112 may comprise one or more surface portions 204 (labeled only as surface portions 204*a-b* in FIG. 2, for clarity). By way of further example and not limitation, in some additional aspects, surface portion(s) 204 may be configured so that float housing unit(s) 112 comprises a five-sided substantially hollow parallelepiped. In still some additional aspects, such parallelepiped may comprise an elongated form.

In some aspects, float protection cover(s) 108 may further comprise at least one tab element 212 that includes at least one hole 208. Tab element(s) 212 may be permanently integrated with or permanently or removably connected to at least one portion of float protection cover(s) 108. Such connection may be made using one or more adhesives, welded joints, screws, nails, pins, bolts, nuts, washers, hooks, clamps, clasps, clips, brackets, or similar connective elements as may be apparent to those skilled in the relative art(s) after reading the description herein, including any combination thereof. By way of example and not limitation, hole(s) 208 may comprise a diameter of approximately 0.6350 cm (0.2500 in.). Hole(s) 208 may be substantially aligned with at least one hole 210 within an upper portion of the sidewall 104 (labeled only as sidewall 104*a* in FIG. 2, for clarity) of water reservoir(s) 102 to which fastening element(s) 120 (not shown in FIG. 2) may be attached. By way of example and not limitation, hole(s) 210 may comprise a #10-32 threaded hole. When hole(s) 208 is substantially aligned with hole(s) 210, the combination may receive fastening element(s) 120 in order to at least partially secure float protection cover(s) 108 in place.

In some aspects, float housing unit(s) 112 may be at least partially maintained in position when an upper surface portion 204 (labeled as upper surface portion 204*a* in FIG.

2) of float housing unit(s) 112 makes at least partial physical contact with a bottom surface 216 of flat portion 130 of float protection cover(s) 108.

Figure 3:
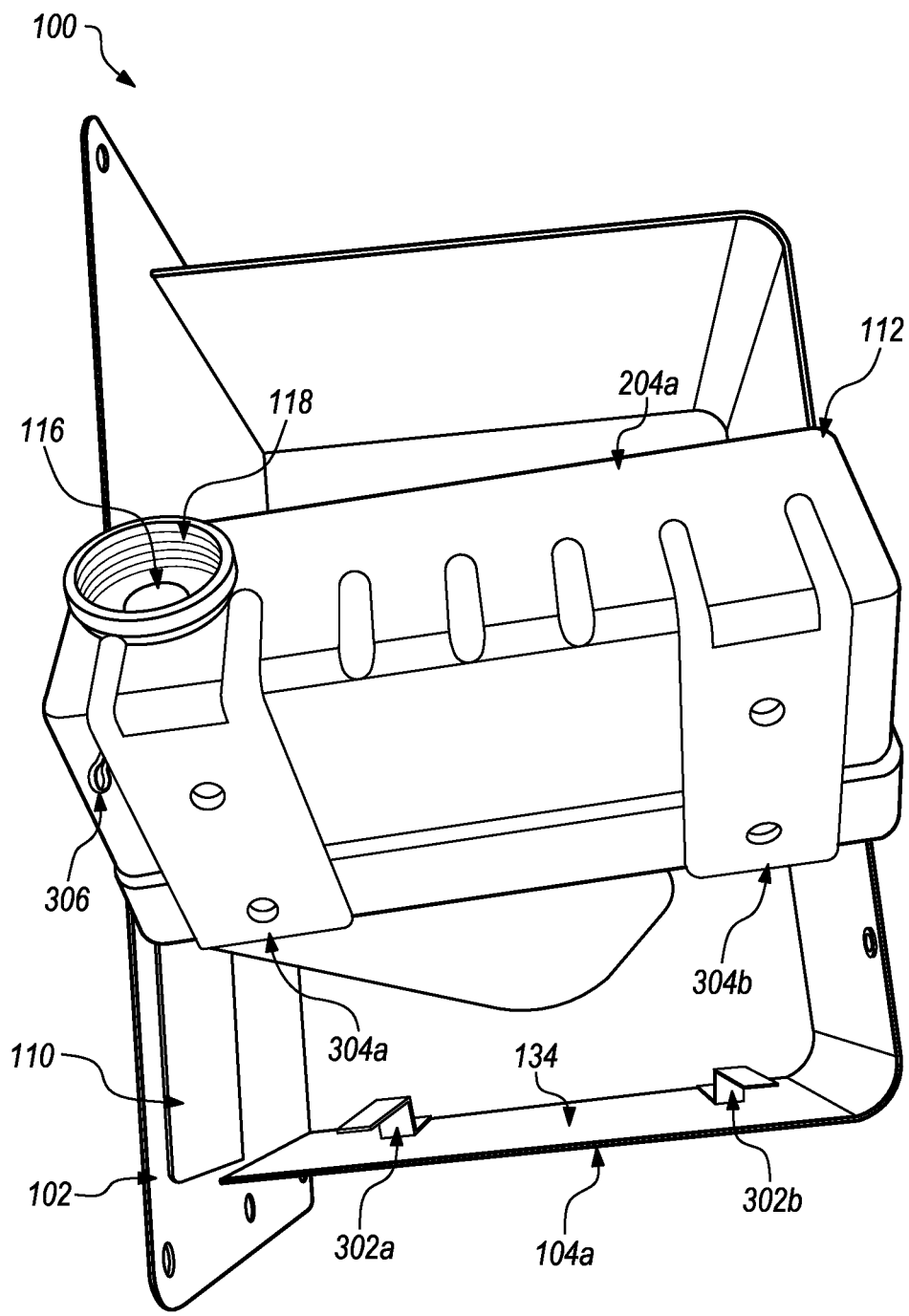
FIG. 3 is a perspective view of a disassembled exemplary water delivery apparatus depicting an exemplary float housing unit, according to an aspect of the present disclosure.

Referring now to FIG. 3, a perspective view of a disassembled exemplary water delivery apparatus 100 depicting an exemplary float housing unit 112, according to an aspect of the present disclosure, is shown.

In some aspects, the sidewall 104 (labeled only as sidewall 104*a* in FIG. 3, for clarity) that is adjacent to the surface portion 204 of float housing unit(s) 112 that does not interact with mounting bracket(s) 110 or fastening element(s) 120 (not shown in FIG. 3) may include at least one mounting prong 302 integrated with an inner portion 134 thereof. By way of example and not limitation, inner portion 134 of that sidewall 104 may comprise a pair of mounting prongs 302 (shown as mounting prongs 302*a-b* in FIG. 3). By way of further example and not limitation, each mounting prong 302 may comprise a width of approximately 1.5875 cm (0.6250 in.) and a length of approximately 11.4300 cm (4.5000 in.). Each mounting prong 302 may be permanently integrated with the relevant sidewall 104 or permanently or removably connected thereto. Such connection may be made using one or more adhesives, welded joints, screws, nails, pins, bolts, nuts, washers, hooks, clamps, clasps, clips, brackets, or similar connective elements as may be apparent to those skilled in the relevant art(s) after reading the description herein, including any combination thereof. By way of still further example and not limitation, mounting prongs 302 may be secured to inner portion 134 of the relevant sidewall 104 a distance of approximately 11.7475 cm (4.2650 in.) apart center-to-center. Each mounting prong 302 may be configured to slidably receive a receiver channel 304 (shown as receiver channels 304*a-b* in FIG. 3) associated with the surface portion 204 of float housing unit(s) 112 adjacent to the sidewall 104 integrated with mounting prong(s) 302. In some aspects, mounting prong(s)s 302 may be at least partially bent at a bottom portion thereof in order to more securely receive receiver channel(s) 304. In some additional aspects, float housing unit(s) 112 may be maintained in position when an upper surface portion 204 (labeled as upper surface portion 204*a* in FIG. 3) of float housing unit(s) 112 at least partially physically contacts a bottom surface 216 (not shown in FIG. 3) of flat portion 130 (not shown in FIG. 3) of float protection cover(s) 108 (not shown in FIG. 3). Receiver channel(s) 304 may be formed as an integral part of the relevant surface portion 204 or they may be securely or removably attached thereto. Such attachment may be made using one or more adhesives, screws, nails, pins, bolts, nuts, washers, hooks, clamps, clasps, clips, brackets, or similar connective elements as may be apparent to those skilled in the relevant art(s) after reading the description herein, including any combination thereof. In some aspects, the location at which float housing unit(s) 112 is positioned upon sidewall 104 may determine the water level that will be maintained within water reservoir(s) 102 by water delivery apparatus 100. In some additional aspects, this level may not be adjustable. In yet some additional aspects, this level may be adjustable such as, by way of example and not limitation, by adjusting the location of mounting prong(s) 302 upon sidewall 104. In still some additional aspects, the water level may be determined by the height of sidewall(s) 104. In such aspects, changing the height of sidewall(s) 104 may alter the position of float protection cover(s) 108 and may thus change the level at which upper surface portion 204*a* of float housing unit(s) 112 physically contacts bottom surface 216 of flat portion 130 of float protection cover(s) 108. The length of mounting prong(s) 302 may need to be adjusted in order to accommodate different heights of sidewall(s) 104 and/or the position of mounting prong(s) 302 upon the inner portion 134 of the relevant sidewall 104 may need to be adjusted as the height of that sidewall 104 varies. As the position of float housing unit(s) 112 changes, so does the position of the float mechanism(s) 202 attached thereto, which in turn changes the water level maintained by float mechanism(s) 202 of water delivery apparatus 100. By way of example and not limitation, the water level maintained within water reservoir(s) 102 may be approximately 6.3500 cm (2.5000 in.) deep, or about 1.0000 gallon.

By way of example and not limitation, mounting prong(s) 302 may comprise any of the materials that may be used for water reservoir(s) 102, float protection cover(s) 108, and/or mounting bracket(s) 110, as well as any combination thereof.

Figure 4:
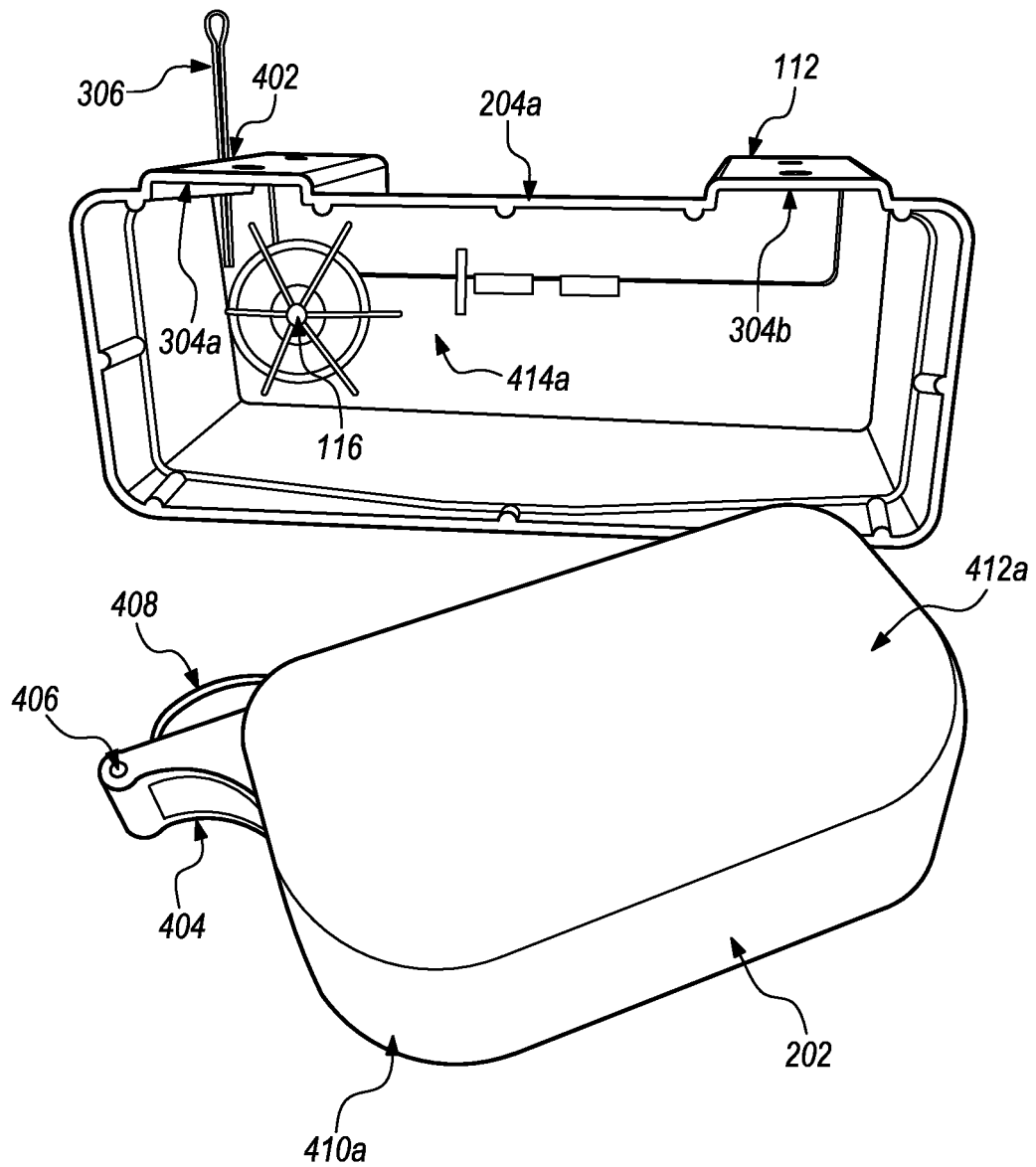
FIG. 4 is a perspective view depicting an interior portion of an exemplary float housing unit as well as an exemplary float mechanism that may be associated with an exemplary water delivery apparatus, according to an aspect of the present disclosure.

Referring now to FIG. 4, a perspective view depicting an interior portion of an exemplary float housing unit 112 as well as an exemplary float mechanism 202 that may be associated with exemplary water delivery apparatus 100, according to an aspect of the present disclosure, is shown.

In some aspects, float housing unit(s) 112 may comprise at least one hole 402 configured to receive a fastening device 306 used to mount float mechanism(s) 202 to float housing unit(s) 112. By way of example and not limitation, fastening device(s) 306 may comprise a cotter pin that is approximately 0.238125 cm (0.09375 in.) wide and 6.3500 cm (2.5000 in.) long; however, as will be appreciated by those skilled in the relevant art(s) after reading the description herein, fastening device(s) 306 may comprise other elements and/or sizes, including screws, bolts, pins, nails, nuts, washers, hooks, clamps, clasps, clips, brackets, as well as any similar devices as may be apparent to those skilled in the relevant art(s) after reading the description herein, including any combination thereof.

In some aspects, by way of example and not limitation, float mechanism(s) 202 may comprise a completely enclosed object, such as, by way of further example and not limitation, an elongated parallelepiped upon which, in some nonlimiting exemplary embodiments, one or more corners 410 (labeled only as corner 410*a* in FIG. 4, for clarity) may be rounded. However, as will be appreciated by those skilled in the relevant art(s) after reading the description herein, many other different shapes and styles may be used for float mechanism(s) 202 without departing from the spirit and scope of the present disclosure. Float mechanism(s) 202 may comprise any materials in any configuration that may allow float mechanism(s) 202 to have at least partial buoyancy when placed in at least one amount of water and/or one or more other fluids. By way of example and not limitation, such materials may comprise one or more plastics, vinyl, wood, expanded polystyrene (such as Styrofoam™ available from the Dow Chemical Co. of Midland, Mich.), other polymers, and/or any similar materials as may be apparent to those skilled in the relevant art(s) after reading the description herein, including any combination thereof. Float mechanism(s) 202 may or may not comprise a substantially hollow configuration. In some additional aspects, at least one interior portion of float mechanism(s) 202 may comprise air or a vacuum.

In some aspects, float mechanism(s) 202 may comprise at least one protruding arm member 404. By way of example and not limitation, arm member(s) 404 may extend outwardly from at least one outer surface 412 (labeled only as outer surface 412*a* in FIG. 4, for clarity) of float mechanism(s) 202. In some additional aspects, by way of further example and not limitation, a top portion of arm member(s) 404 may be substantially flat and a bottom portion of arm member(s) 404 may be at least slightly curved in order to provide it with increased stability and/or durability. In such aspects, the top portion (or any other appropriate portion) of arm member(s) 404 may be configured to securely retain at least one sealing element 408 via a permanent or removable attachment or connection. Such attachment or connection may be made using one or more adhesives, screws, nails, pins, bolts, nuts, washers, hooks, clamps, clasps, clips, brackets, or similar connective elements as may be apparent to those skilled in the relevant art(s) after reading the description herein, including any combination thereof. In some nonlimiting exemplary embodiments, sealing element(s) 408 may be comprised of an at least partially flexible material, such as, by way of example and not limitation, rubber or plastic(s), or any other appropriate flexible or nonflexible material as may be apparent to those skilled in the relevant art(s) after reading the description herein, including any combination thereof. Sealing element(s) 408 may comprise any shape and size sufficient to at least partially block, and in some aspects completely block, orifice(s) 116 and/or water supply inlet(s) 118 (not shown in FIG. 4) when positioned adjacently thereto. As will be apparent to those skilled in the relevant art(s) after reading the description herein, sealing element(s) 408 may be configured upon various other portions of float mechanism(s) 202, including one or more outer surfaces 412 thereof or one or more portion of various types of arm members 404 associated or integrated therewith. In yet some additional aspects, sealing element(s) 408 may comprise one or more portions of float mechanism(s) 202, such as, by way of example and not limitation, a portion of one or more outer surfaces 412 of float mechanism(s) 202 or a portion of arm member(s) 404.

In some aspects, arm member(s) 404 of float mechanism(s) 202 may comprise at least one hollow conduit 406 traversing a distal end thereof. Conduit(s) 406 may be configured to receive at least one portion of fastening device(s) 306 in order help keep at least one portion of float mechanism(s) 202 at a substantially consistent and/or desired location or position within float housing unit(s) 112 while allowing the rest of float mechanism(s) 202 to rise and fall with the water lever level within water reservoir(s) 102 (not shown in FIG. 4).

When water delivery apparatus 100 may be connected to at least one continuous water supply via water supply inlet(s) 118 and/or orifice(s) 116, the water level within water reservoir(s) 102 (not shown in FIG. 4) may rise until the water within float housing unit(s) 112 raises float mechanism(s) 202 to a position at which sealing element(s) 408 at least partially blocks water supply inlet(s) 118 and/or orifice(s) 116, thereby slowing or stopping the flow of incoming water and preventing the water quantity (and water level) within water reservoir(s) 102 from exceeding the substantially consistent height at which it is maintained. Once one or more animals drink some of the water within water reservoir(s) 102 and/or some of the water evaporates, gets spilled, and/or otherwise is removed from water reservoir(s) 102, float mechanism(s) 202 may descend to a position at which water supply inlet(s) 118 and/or orifice(s) 116 is no longer blocked, thereby allowing water to resume flowing into water reservoir(s) 102 until float mechanism(s) 202 again rises to a level where sealing element(s) 408 blocks water supply inlet(s) 118 and/or orifice(s) 116. With this configuration, a user may not be required to regularly monitor water delivery apparatus 100, refill water delivery apparatus 100, or perform other maintenance tasks unless a portion of water delivery apparatus 100 becomes damaged, breaks, or needs routine cleaning or other maintenance. This gives the user more time to perform other tasks or to engage in recreational activities.

In some aspects, water delivery apparatus 100 may be configured to receive water at water supply inlet(s) 118 and/or orifice(s) 116 at a pressure ranging from approximately 20 pounds per square inch gauge (psig) to 50 psig at a flow rate of over 200 gallons per hour, thereby providing a relatively rapid fill time. Having a relatively rapid fill rate may help facilitate the ability of one or more animals to drink from water delivery apparatus 100 without having to stop and wait for more water. However, as will be appreciated by those skilled in the relevant art(s) after reading the description herein, water delivery apparatus 100 may be configured to accommodate other pressures and/or flow/fill rates without departing from the spirit and scope of the present disclosure.

Figure 5:
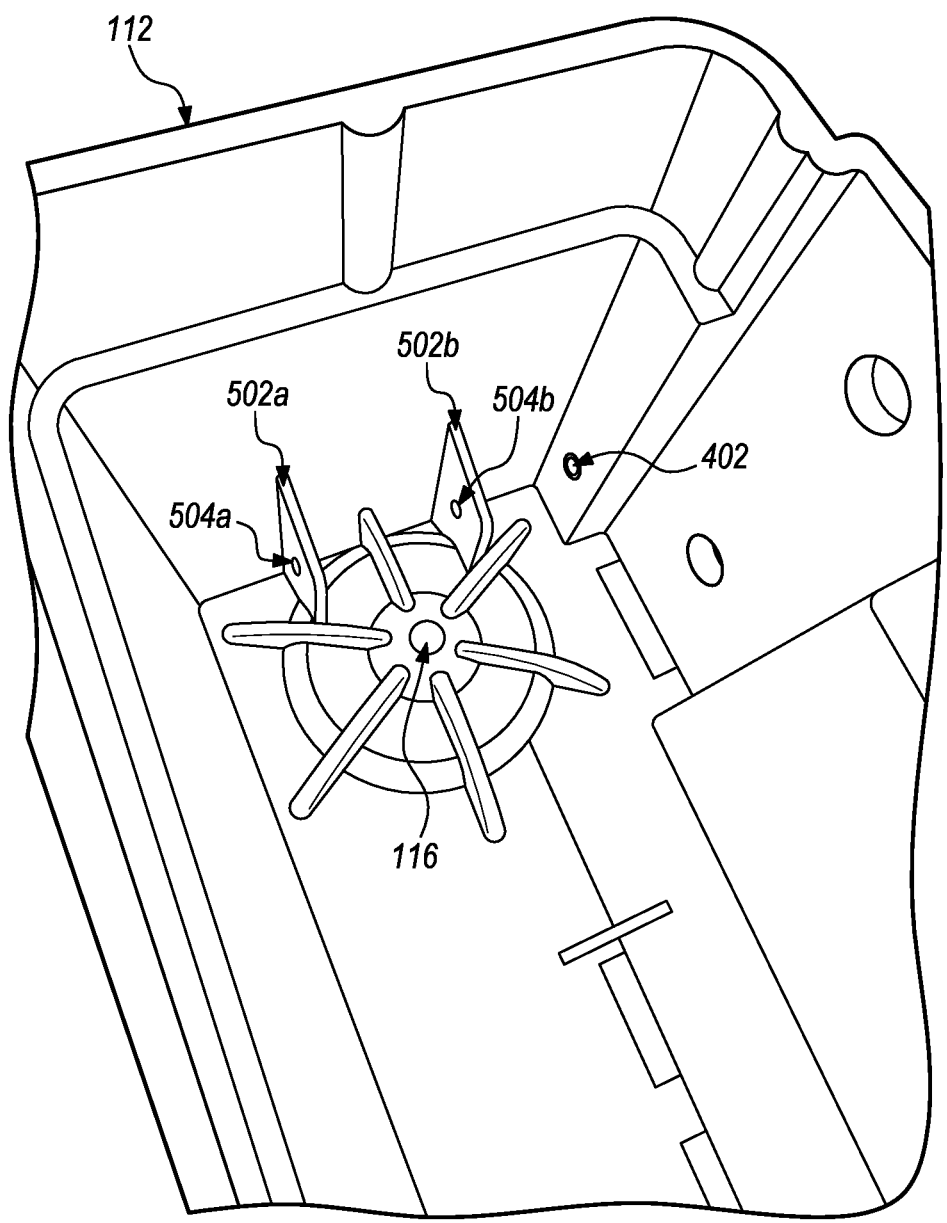
FIG. 5 is a perspective view of an interior portion of an exemplary float housing unit that may be associated with an exemplary water delivery apparatus, according to an aspect of the present disclosure.

Referring now to FIG. 5, a perspective view of an interior portion of an exemplary float housing unit 112 that may be associated with exemplary water delivery apparatus 100, according to an aspect of the present disclosure, is shown.

In some aspects, one or more protruding members 502 (shown as protruding members 502a-b in FIG. 5) may extend from an inner surface portion 414 (labeled only as inner surface portion 414a in FIG. 4, for clarity) (not labeled in FIG. 5, for clarity) of the surface portion 204 of float housing unit(s) 112 that comprises water supply inlet(s) 118 (not shown in FIG. 5). Each protruding member 502 may comprise at least one hole 504 (shown as holes 504a-b in FIG. 5). Hole(s) 504 may be substantially aligned with hole(s) 402 of float housing unit(s) 112 in order to removably or permanently receive fastening device(s) 306 (not shown in FIG. 5). Additionally, conduit(s) 406 (not shown in FIG. 5) of float mechanism(s) 202 (not shown in FIG. 5) may be aligned with hole(s) 504 and hole(s) 402 in order to also receive at least one portion of fastening device(s) 306 therein. By configuring conduit(s) 406 of float mechanism(s) 202 between two protruding members 502, at least one portion of float mechanism(s) 202 may be maintained at a substantially consistent and/or desired location or position within float housing unit(s) 112 once fastening device(s) 306 is in place while allowing the rest of float mechanism(s) 202 to rise and fall with the water level within water reservoir(s) 102 (not shown in FIG. 5). In some additional aspects, protruding member(s) 502 may comprise an elongated form.

Figure 6:
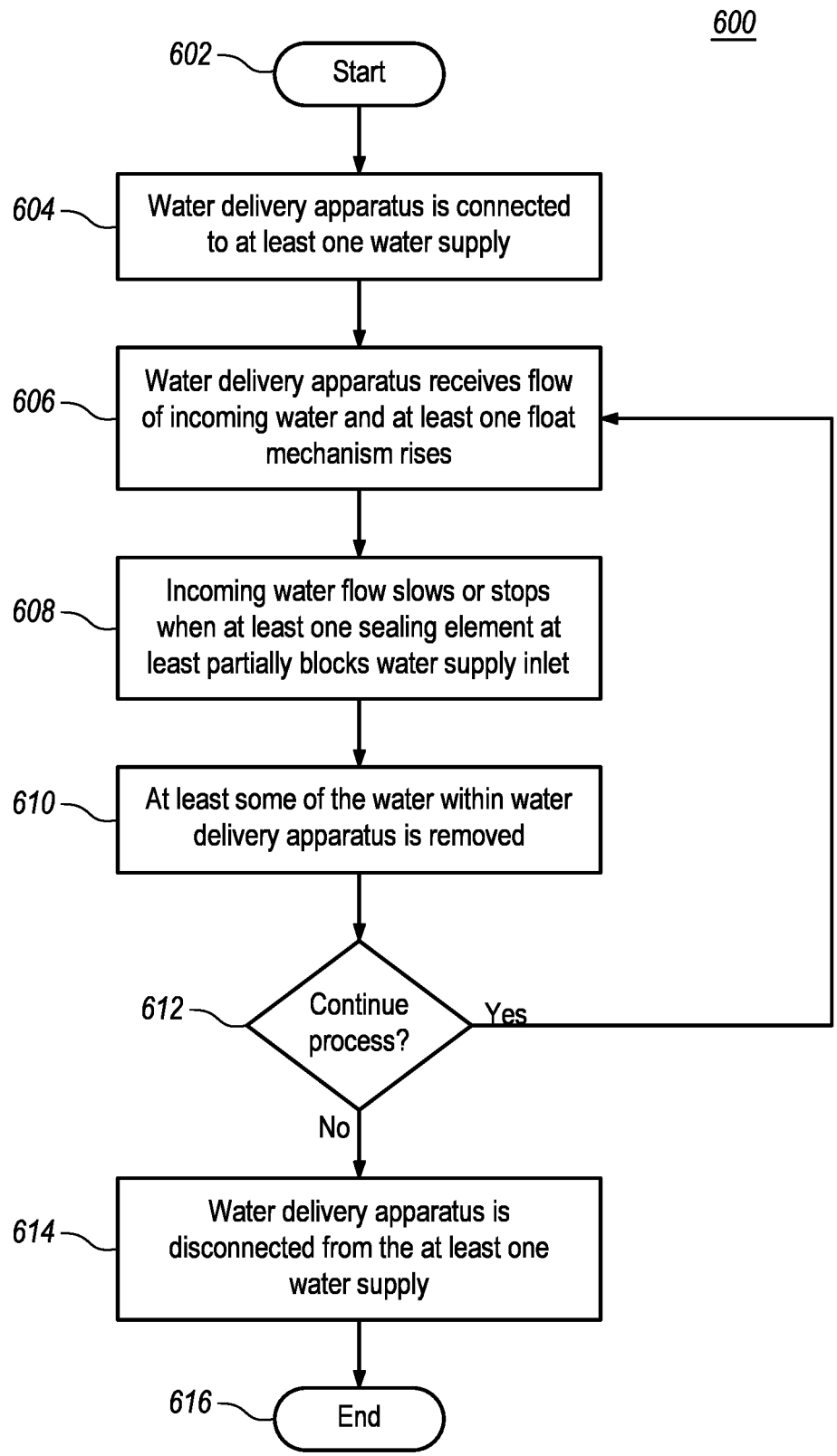
FIG. 6 is a flowchart illustrating an exemplary process for providing at least one amount of water to at least one animal using an exemplary water delivery apparatus, according to an aspect of the present disclosure.

Referring now to FIG. 6, a flowchart illustrating an exemplary process 600 for providing at least one amount of water to at least one animal using exemplary water delivery apparatus 100, according to an aspect of the present disclosure, is shown.

Process 600 begins at step 602 with control passing immediately to step 604.

At step 604, water delivery apparatus 100 (not shown in FIG. 6) is connected to at least one water supply. The water supply may comprise any water source capable of delivering an amount of drinkable water to water delivery apparatus 100, including one or more indoor or outdoor faucets or spigots, pumping mechanisms, bottles, jugs, lakes, ponds, rivers, wells (groundwater), as well as any similar water sources as may be apparent to those skilled in the relevant art(s) after reading the description herein, including any combination thereof. By way of example and not limitation, the at least one water supply may be connected to water delivery apparatus 100 via orifice(s) 116 (not shown in FIG. 6) and/or water supply inlet(s) 118 (not shown in FIG. 6). By way of further example and not limitation, this may involve connecting a garden hose, hard piping, polyvinyl chloride (PVC) piping, jug, bottle, or any similar device or structure as may be apparent to those skilled in the relevant art(s) after reading the description herein to orifice(s) 116 and/or water supply inlet(s) 118.

In aspects wherein the at least one water supply may need to be turned on, such as when the water supply may comprise a faucet, spigot, and/or pumping mechanism, this may also be done at step 604.

Once water delivery apparatus 100 has been connected to at least one water supply, process 600 proceeds to step 606.

At step 606, water delivery apparatus 100 receives a flow of incoming water. The incoming water may proceed to float housing unit(s) 112 (not shown in FIG. 6) and water reservoir(s) 102 (not shown in FIG. 6). As the water quantity (and water level) increases within float housing unit(s) 112 (and water reservoir(s) 102), float mechanism(s) 202 (not shown in FIG. 6) begins to rise with the water level.

At step 608, at least one sealing element 408 (not shown in FIG. 6) associated with float mechanism(s) 202 at least partially blocks water supply inlet(s) 118 and/or orifice(s) 116 in order to slow or stop the incoming water flow when the quantity of water within water reservoir(s) 102 reaches the substantially consistent level at which it is to be maintained and thereby causes float mechanism(s) 202 and associated sealing element(s) 408 to rise to a position that facilitates such at least partial blocking. In some aspects, sealing element(s) 408 may need to completely block water supply inlet(s) 118 and/or orifice(s) 116 in order to stop the incoming water flow.

Once the incoming water flow has been sufficiently slowed or stopped, process 600 proceeds to step 610.

At step 610, at least one portion of the water within at least one portion of water delivery apparatus 100 (such as, for example and not limitation, water reservoir(s) 102) gets removed. By way of example and not limitation, this may occur if one or more animals drink some of the water, some of the water evaporates, and/or some of the water spills out. As will be appreciated by those skilled in the relevant art(s) after reading the description herein, water may be removed by various other means as well.

Once at least some water has been removed from water delivery apparatus 100, process 600 proceeds to step 612.

At step 612, it is determined if process 600 should continue. Typically, process 600 will continue for very long periods of time in order to provide a continuous availability of water to one or more animals, including horses, livestock, and/or pets. The continuation of process 600 allows for animals to receive drinking water without a user having to keep refilling a watering dish/bowl/trough/tank/tray/reservoir/etc. and/or otherwise perform regular maintenance on the water delivery means for those animals. Process 600 may only need to be stopped if drinking water no longer needs to be provided to any animals and/or if cleaning, repair, and/or maintenance needs to be performed on water delivery apparatus 100.

If it is determined that process 600 should continue, process 600 proceeds back to step 606. If it is determined that process 600 should not continue, process 600 proceeds to step 614. The determination of whether to continue process 600 may depend at least partially on whether any more animals need drinking water and/or whether water delivery apparatus 100 requires any maintenance, repair, and/or cleaning work done. In some aspects, it may be determined that process 600 should be discontinued before any water has been removed from water delivery apparatus 100.

At step 614, water delivery apparatus 100 is disconnected from the at least one water supply. In some aspects, by way of example and not limitation, this may involve a user turning off the at least one water supply (as in the case of when the water supply comprises a faucet, spigot, and/or pumping mechanism), and/or by the user disconnecting the at least one water supply from water supply inlet(s) 118 and/or orifice(s) 116. By way of example and not limitation, this may involve disconnecting a garden hose, hard piping, polyvinyl chloride (PVC) piping, jug, bottle, or any similar device or structure as may be apparent to those skilled in the relevant art(s) after reading the description herein from to orifice(s) 116 and/or water supply inlet(s) 118. Additionally, in some aspects, a user may decide to drain any remaining water from within water delivery apparatus 100 by unblocking or opening coupling(s) 122 (not shown in FIG. 6) at bottom portion 106 of water reservoir(s) 102. The water may be allowed to drain to any appropriate location, such as, by way of example and not limitation, the ground, a body of water (e.g., a lake, pond, river, etc.), or a sewer pipe drain. Water may also be removed from water delivery apparatus 100 by tilting water delivery apparatus 100 until the water spills out over sidewalls 104 (not shown in FIG. 6). Removing the water from within water delivery apparatus 100 may be advantageous, for example, for storing water delivery apparatus 100 without it getting dirty, rusty, or otherwise damaged and/or for preventing the water from later spilling out unintentionally if water delivery apparatus 100 is inadvertently knocked over.

Once water delivery apparatus 100 has been disconnected from the at least one water supply and optionally drained, process 600 proceeds to step 616.

At step 616 process 600 is terminated and process 600 ends.

As will be appreciated by those skilled in the relevant art(s) after reading the description herein, in some aspects steps 604 and 614 of process 600 may be skipped as it may not be necessary to connect and/or disconnect water delivery apparatus 100 to/from the at least one water supply.

Figure 7:
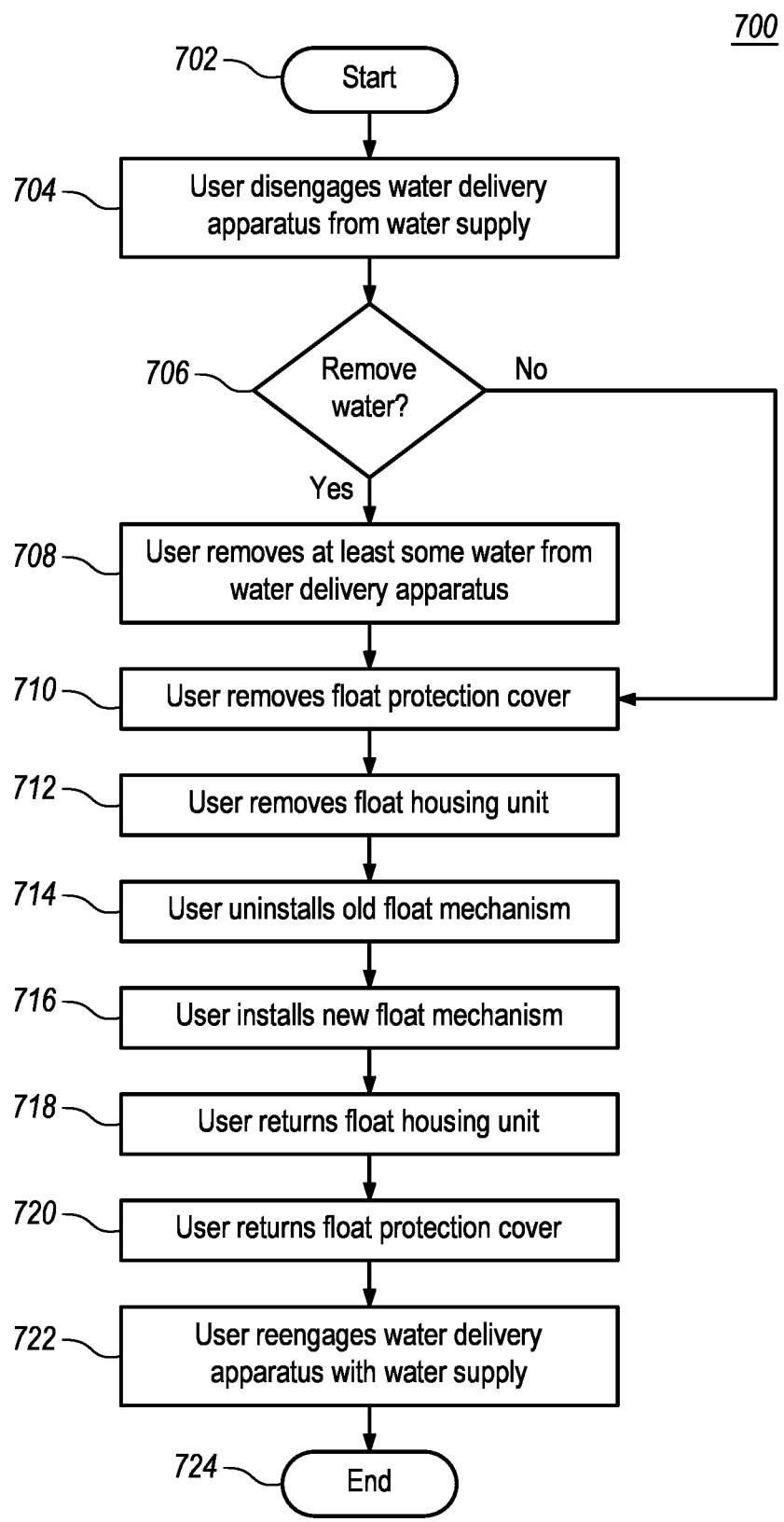
FIG. 7 is a flowchart illustrating an exemplary process for replacing at least one float mechanism within an exemplary water delivery apparatus, according to an aspect of the present disclosure.

Referring now to FIG. 7, a flowchart illustrating an exemplary process 700 for replacing at least one float mechanism 202 within exemplary water delivery apparatus 100, according to an aspect of the present disclosure, is shown.

In some aspects, the design of water delivery apparatus 100 may be such that if float mechanism(s) 202 needs to be replaced, it may be accessed by a user quickly and easily using few, if any, tools.

Process 700 begins at step 702 with control passing immediately to step 704.

At step 704, a user disengages water delivery apparatus 100 (not shown in FIG. 7) from at least one water supply. By way of example and not limitation, in some aspects, this may involve turning off the at least one water supply (such as in aspects wherein the water supply comprises a faucet, spigot, and/or pumping mechanism), and/or disconnecting the at least one water supply from water supply inlet(s) 118 (not shown in FIG. 7) and/or orifice(s) 116 (not shown in FIG. 7). Once the water supply(ies) has been disengaged, process 700 proceeds to step 706.

At step 706, the user determines whether to remove at least some of the water from water delivery apparatus 100. This determination may be made, at least partially, based on how much water is currently within water delivery apparatus

100. By way of example and not limitation, if the user can access and replace float mechanism(s) 202 (not shown in FIG. 7) without getting wet and/or making a mess, then the user may decide not to remove any water from water delivery apparatus 100; otherwise, the user may be likely to opt to remove at least some of the water from water delivery apparatus 100.

If the determination is affirmative, process 700 proceeds to step 708. If the determination is negative, process 700 proceeds to step 710.

At step 708, the user removes at least one portion of the water from within water delivery apparatus 100. This water may be removed from float housing unit(s) 112 (not shown in FIG. 7) and/or water reservoir(s) 102 (not shown in FIG. 7). The water may be removed by, for example and not limitation, unblocking or opening coupling(s) 122 (not shown in FIG. 7), by tipping and/or tilting water delivery apparatus 100 so that water spills out over sidewall(s) 104 (not shown in FIG. 7), or by any similar means as may be apparent to those skilled in the relevant art(s) after reading the description herein. The user may decide to remove all of the water from water delivery apparatus 100 or only one portion of it. After a necessary or desired amount of water has been removed from water delivery apparatus 100, process 700 proceeds to step 710.

At step 710, the user removes float protection cover(s) 108 (not shown in FIG. 7) from its secure position upon water delivery apparatus 100. By way of example and not limitation, this may be accomplished by the user loosening and/or otherwise removing fastening element(s) 120 (not shown in FIG. 7) from its secure position within holes 208 (not shown in FIG. 7) and 210 (not shown in FIG. 7) associated with float protection cover(s) 108 and the relevant sidewall 104 of water reservoir(s) 102, respectively. By way of further example and not limitation, in some aspects, fastening element(s) 120 may be loosened and/or removed either by hand or with the use of one or more tools, such as a screwdriver, a wrench, pliers, and/or the like. Once fastening element(s) 120 is removed, the user may slide and lift float protection cover(s) 108 out of and away from its installed position while disengaging it from physical contact with protruding portion 132 (not shown in FIG. 7) of mounting bracket(s) 110 (not shown in FIG. 7) that helps keep float protection cover(s) 108 in place. Once float protection cover(s) 108 has been removed, process 700 proceeds to step 712.

At step 712, the user removes float housing unit(s) 112 from its secure position within water delivery apparatus 100. By way of example and not limitation, this may be accomplished by the user sliding it upwards so that receiver channel(s) 304 (not shown in FIG. 7) of float housing unit(s) 112 are freed from mounting prong(s) 302 (not shown in FIG. 7) associated with the inner portion 134 (not shown in FIG. 7) of the relevant sidewall(s) 104 of water reservoir(s) 102. Once float housing unit(s) 112 has been successfully removed, process 700 proceeds to step 714.

At step 714, the user uninstalls the float mechanism(s) 202 that is to be replaced. By way of example and not limitation, this may be accomplished by the user removing (e.g., via pulling and/or twisting) fastening device(s) 306 (not shown in FIG. 7) from its secure position within holes 402 (not shown in FIG. 7) and 504 (not shown in FIG. 7) of float housing unit(s) 112 and from within conduit(s) 406 (not shown in FIG. 7) of float mechanism(s) 202. Once fastening device(s) 306 has been removed, the user may freely pull float mechanism(s) 202 out of float housing unit(s) 112. Process 700 then proceeds to step 716.

At step 716, the user installs the new float mechanism(s) 202. By way of example and not limitation, this may be accomplished by the user positioning the new float mechanism(s) 202 such that its conduit(s) 406 lines up with holes 402 and 504 of float housing unit(s) 112 and so that float mechanism(s) 202 otherwise fits within float housing unit(s) 112. The user may then insert fastening device(s) 306 into the aligned holes 402 and 504 and conduit(s) 406 and into its secure position (e.g., via pushing and/or twisting) in order to effectively fix the distal end of arm member(s) 404 of float mechanism(s) 202 to float housing unit(s) 112. Process 700 then proceeds to step 718.

At step 718, the user returns float housing unit(s) 112 to its secure location within water delivery apparatus 100. By way of example and not limitation, this may be accomplished by the user positioning float housing unit(s) 112 such that receiver channel(s) 304 of float housing unit(s) 112 substantially align with mounting prong(s) 302 associated with the inner portion 134 of the relevant sidewall(s) 104 of water reservoir(s) 102. The user may then slide float housing unit(s) 112 downwardly upon mounting prong(s) 302 until float housing unit(s) 112 is secured into place. Process 700 then proceeds to step 720.

At step 720, the user returns float protection cover(s) 108 to its secure location upon water delivery apparatus 100. By way of example and not limitation, this may be accomplished by the user positioning float protection cover(s) 108 over float housing unit(s) 112 and aligning hole(s) 208 associated with one end of float protection cover(s) 108 with hole(s) 210 associated with the relevant sidewall 104 of water reservoir(s) 102 while simultaneously reengaging the other end of float protection cover(s) 108 with mounting bracket(s) 110 such that at least partial physical contact is made between bottom surface 206 (not shown in FIG. 7) of protruding portion 132 of mounting bracket(s) 110 and top surface 218 of flat portion 130 of float protection cover(s) 108 to help keep float protection cover(s) 108 in place. The user may then insert and secure fastening element(s) 120 within aligned holes 208 and 210, such as, by way of example and not limitation, with a simple tool (e.g., a screwdriver, a wrench, pliers, etc.) or by hand. Process 700 then proceeds to step 722

At step 722, the user reengages water delivery apparatus 100 with the at least one water supply. By way of example and not limitation, in some aspects, this may involve turning on the at least one water supply (such as in aspects wherein the water supply comprises a faucet, spigot, and/or pumping mechanism), and/or connecting the at least one water supply to water supply inlet(s) 118 and/or orifice(s) 116. Once the water supply(ies) has been successfully reengaged, process 700 proceeds to step 724.

At step 724 process 700 is terminated and process 700 ends.

As will be appreciated by those skilled in the relevant art(s) after reading the description herein, process 700 or one or more of its steps may be used to perform one or more other various repair and/or maintenance tasks upon water delivery apparatus 100, including but not limited to repairing and/or replacing float housing unit(s) 112 and/or float protection cover(s) 108 and/or repairing one or more float mechanisms 202.

It is noted that the order of the steps of processes 600 and 700, including the starting points thereof, may be altered without departing from the scope of the present disclosure, as will be appreciated by those skilled in the relevant art(s) after reading the description herein.

Even though water delivery apparatus 100 is disclosed with an exemplary configuration with exemplary components that have exemplary sizes and shapes, it will be appreciated by those skilled in the relevant art(s) after reading the description herein that various changes in the size, shape, number of, and configuration of the various components of water delivery apparatus 100 may be made without departing from the spirit and scope of the present disclosure. As will also be appreciated by those skilled in the relevant art(s) after reading the description herein, water delivery apparatus 100 may be used for other applications alternative to providing drinking water to animals, such as to keep a water fountain at a constant fill level, to maintain a constant water level in a pool, as well as others.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation with water supply sources, materials, and methods other than those mentioned herein). As will be appreciated by those skilled in the relevant art(s) after reading the description herein, certain features from different aspects of the apparatuses and methods of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An apparatus, comprising:
    a water reservoir including four sidewalls and a bottom portion;
    a pair of upwardly extending mounting prongs on a lower half of an inner surface of one of the four sidewalls of the water reservoir;
    a float housing secured to one of the sidewalls of the water reservoir;
    a pair of receiver channels formed in a surface of the float housing, each receiver channel being configured for slidably receiving the mounting prongs;
    a water supply inlet formed in an upper surface of the float housing for coupling to a water supply;
    a buoyant float disposed at least partially within the float housing and pivotally secured to the float housing, wherein the buoyant float is free to rise and fall with a water level within the water reservoir;
    a sealing element configured to cut off the water supply inlet when the water level within the water reservoir causes the buoyant float to rise to a certain level; and
    a float protection cover secured to the reservoir to secure and protect the float housing.

2. The apparatus of claim 1, wherein the float protection cover includes a first flat portion extending over a top of the float housing and a second flat portion extending down one side of the float housing, wherein three sidewalls of the water reservoir, the bottom portion of the water reservoir, and the first and second portions of the float protection cover form a compartment protecting the float housing on all sides.

3. The apparatus of claim 1, wherein the float protection cover has a flat top portion, a flat side portion, and a tab element extending over an upper edge of two sidewalls of the water reservoir.

4. The apparatus of claim 3, further comprising:
    a thumb screw for securing the float protection cover in an operative position to secure and protect the float housing, wherein the thumb screw extends horizontally through a hole in the tab element to threadably engage a threaded hole in a front sidewall of the four sidewalls of the water reservoir.

5. The apparatus of claim 4, further comprising:
    an L-shaped mounting bracket extending from a rear sidewall of the four sidewalls of the water reservoir to prevent the float protection cover from moving upward when the float protection cover is secured in the operative position with the thumb screw.

6. The apparatus of claim 1, wherein the float protection cover extends over a top of the float housing to prevent the float housing from rising up to a point of disengaging from the upwardly extending mounting prongs.

7. The apparatus of claim 6, wherein the float protection cover contacts an upper surface of the float housing to prevent the float housing from moving.

8. The apparatus of claim 6, further comprising:
    an open slot in a flat top portion of the float protection cover that extends over the top of the float housing, wherein the pair of upwardly extending mounting prongs position the float housing so that the water supply inlet is accessible to a water supply conduit through the open slot.

9. The apparatus of claim 8, wherein the water supply inlet includes a threaded connector for coupling to a water supply hose or pipe, and wherein the open slot opens to a back edge of the float protection cover allowing the float protection cover to be removed without disconnecting water supply hose or pipe from the water supply inlet.

10. The apparatus of claim 1, wherein the buoyant float include an arm member hingedly secured to the float housing, wherein the arm member secures the sealing element in a position upwardly facing an orifice in the water supply inlet of the float housing, wherein the sealing element is configured to block the orifice and cut off the water supply when the water level within the water reservoir rises to a certain level.

11. The apparatus of claim 1, wherein the float housing has an open bottom, wherein the float protection cover has a side portion extending along a side of the float housing, and wherein the side portion of float protection cover is angled to leave an opening between one of the four sidewalls of the water reservoir and around the side portion.

12. The apparatus of claim 1, wherein the water reservoir includes a flat rear sidewall of the four sidewalls extending beyond the water reservoir to form a flange with holes for receiving a fastener to facilitate mounting the water reservoir to a wall of a building, wherein the flat rear sidewall and the flange are coplanar.

13. The apparatus of claim 12, wherein the water reservoir is made of stainless steel and includes a right sidewall, a front sidewall, and a left sidewall that are made with a single sheet of stainless steel bent to form rounded corners there between.

14. The apparatus of claim 1, further comprising:
a drain opening located in the bottom portion of the water reservoir in a central location that is not covered by the float protection cover.

15. The apparatus of claim 14, further comprising:
a threaded pipe coupling extending below the water reservoir in alignment with the drain opening located in the bottom portion of the water reservoir.

16. The apparatus of claim 1, further comprising at least one flow meter coupled to the water supply inlet to measure an amount of water delivered to the water reservoir.

17. The apparatus of claim 1, wherein the float and float housing are made of plastic, and wherein the water reservoir and float protection cover are made of stainless steel.

* * * * *